Figure 1:
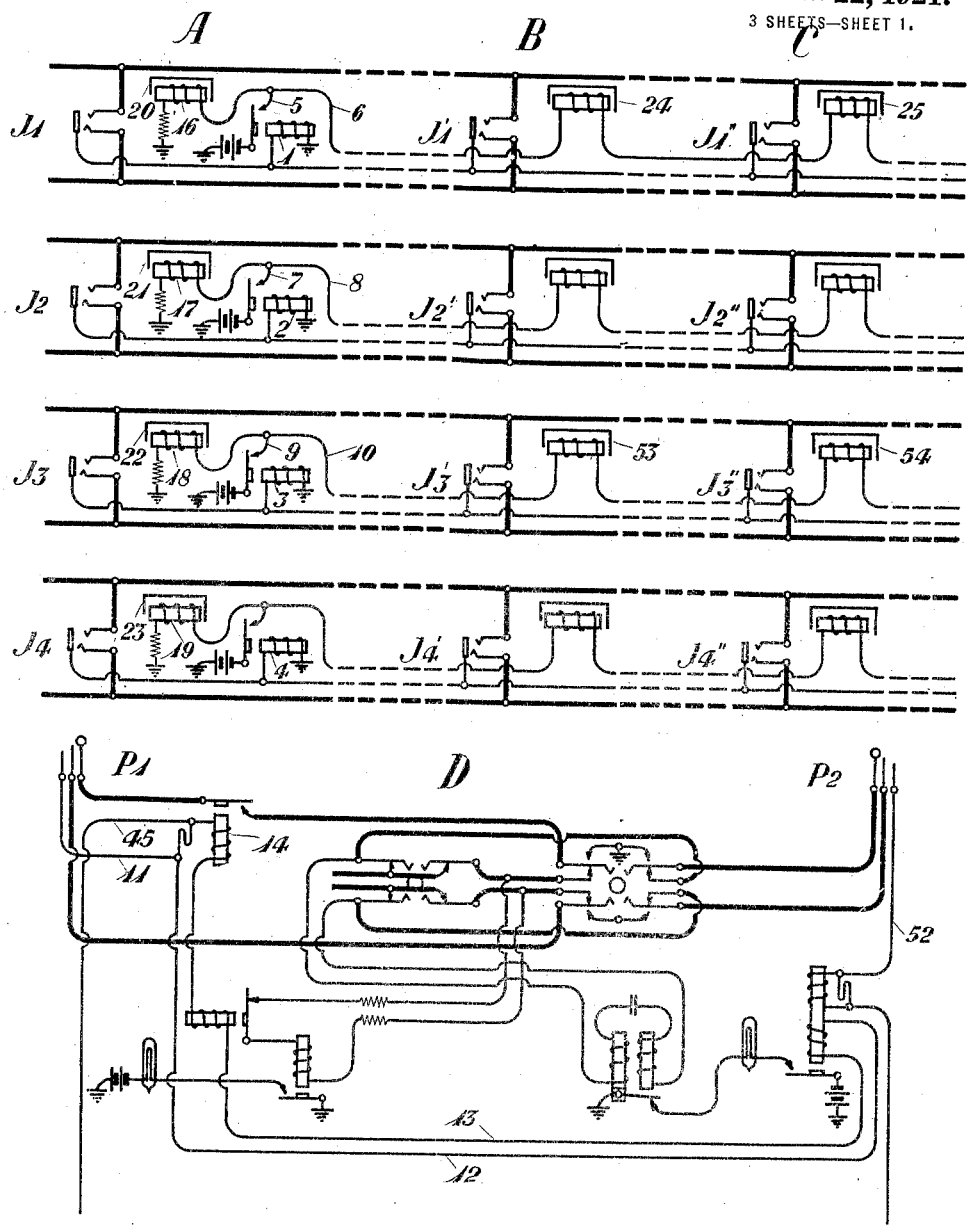

J. F. TOOMEY.
BUSY SIGNAL TESTING APPARATUS.
APPLICATION FILED APR. 4, 1919.

1,372,050.

Patented Mar. 22, 1921.

INVENTOR.
J. F. Toomey
BY
ATTORNEY.

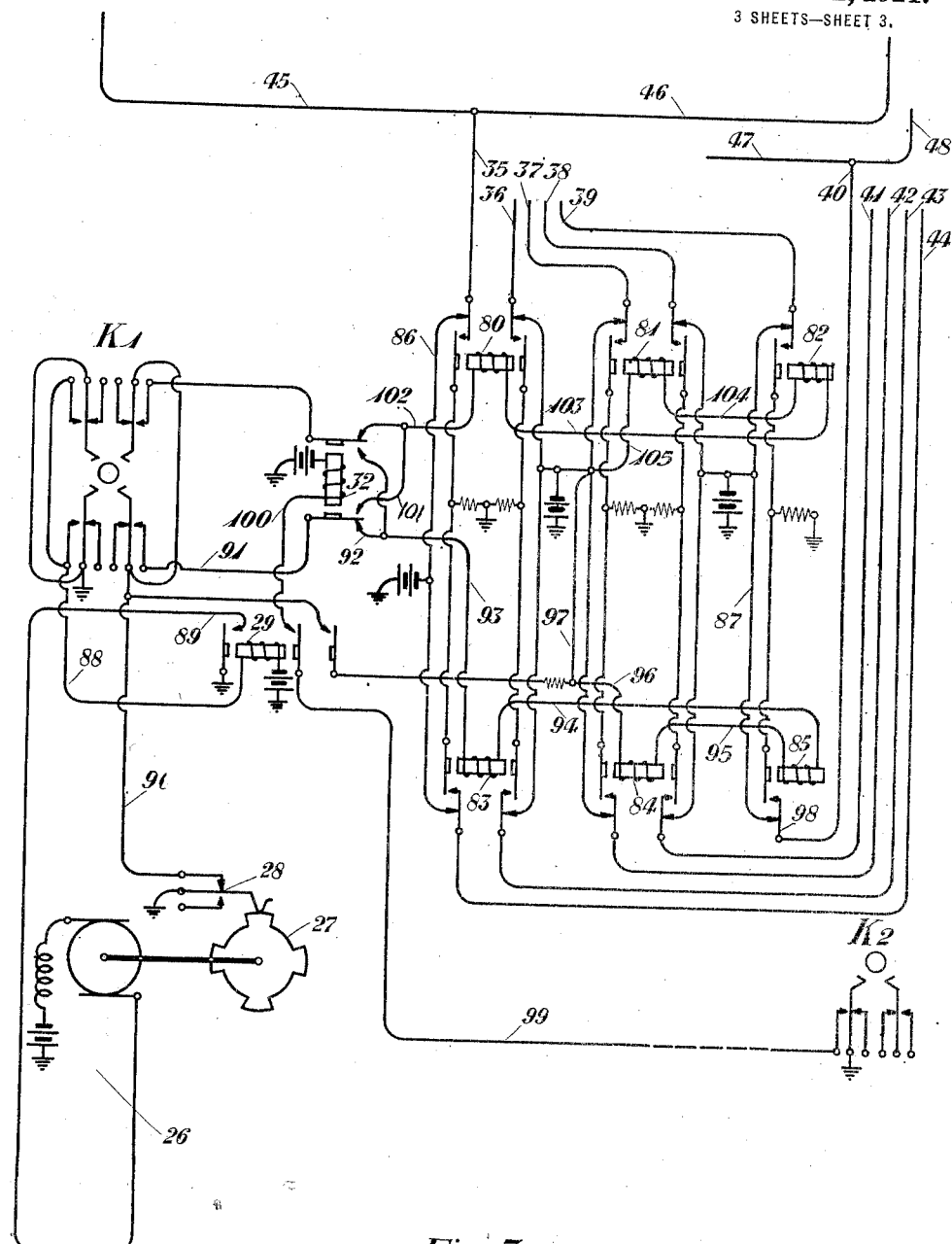

UNITED STATES PATENT OFFICE.

JOHN F. TOOMEY, OF NEW YORK, N. Y., ASSIGNOR TO AMERICAN TELEPHONE AND TELEGRAPH COMPANY, A CORPORATION OF NEW YORK.

BUSY-SIGNAL-TESTING APPARATUS.

1,372,050.

Specification of Letters Patent.  Patented Mar. 22, 1921.

Application filed April 4, 1919. Serial No. 287,501.

*To all whom it may concern:*

Be it known that I, JOHN F. TOOMEY, residing at New York, in the county of New York and State of New York, have invented certain Improvements in Busy-Signal-Testing Apparatus, of which the following is a specification.

This invention relates to telephone systems and particularly to signaling apparatus associated therewith.

A long distance line is usually arranged to terminate in multiple jacks located at a plurality of positions at a switchboard. Associated with each of these jacks is a drop or annunciator which will operate whenever a connection is made with the line at any position and will serve as a busy signal to indicate to operators at the other positions that such a line is busy or in use. In order to test the operation of these drops or busy signals it is customary for the test man to make a connection with a line at one of the multiple jacks at a position at one end of the switchboard, and then by walking along the switchboard to observe the operation of the busy signals associated with the other multiple jacks of the line located at other positions on the switchboard. Accordingly, it is a feature of this invention to provide a testing arrangement whereby the busy signals of a plurality of lines may be tested at the same time. Another feature consists in arrangements whereby the test man may test the busy signals of one set of lines while walking from one end of a switchboard to the other and may test the busy signals of a different set of lines upon his return trip along the switchboard. A further feature consists in arrangements for testing busy signals under conditions similar to those existing in actual use of the lines. Other features of the invention will be clear from the detailed description of the operation of the invention.

It is customary to provide ten cord circuits at a position on a long distance switchboard. Accordingly, by using both ends of all the cords, connections may be made with twenty lines at the same time and the busy signals of such lines tested. It is the practice to associate with the cord circuits at a position at one end of the switchboard apparatus which will interrupt the sleeve circuits of the cords and cause the intermittent operation of the busy signals so that their operation may be more readily observed. This interrupting apparatus is associated with the sleeve circuits of all of the ten cord circuits in such a manner that, when a key is operated, the sleeve circuits of alternate cords, such as cords numbered 1, 3, 5, 7 and 9, will be interrupted but the sleeve circuits of the other cords, such as cords numbered 2, 4, 6, 8 and 10 will not be interrupted. Cord number 1 will now be connected with lines such as 1 and 3, cord number 2 will be connected with lines such as 2 and 4, cord number 3 will be connected with lines, such as 5 and 7, cord number 4 will be connected with lines, such as 6 and 8. The other cords will be connected in order to alternate lines in a similar manner so that the cords, such as 1, 3, 5, 7 and 9, whose sleeve circuits are being interrupted will be connected to alternate lines such as the odd numbered lines, and the cords, such as 2, 4, 6, 8 and 10, whose sleeve circuits are not interrupted are connected to the other lines, such as the even numbered lines. When the ten cords are connected with the twenty lines in this manner and the key operated the busy signals of the alternate lines, such as the odd numbered lines 1, 3, 5, 7, etc., will operate intermittently, and the busy signals of the lines, such as lines 2, 4, 6, 8, etc., will operate normally. It is necessary to provide a means for the intermittently operating of busy signals on alternate lines only, because the electro-magnetic apparatus of the busy signals of lines located next to one another are in the same magnetic field, and the intermittent operation of the busy signals of one line would tend to disturb the electromagnetic means and busy signals on an adjoining line. The test man may now walk along the board and observe at each position the operation of the busy signals of a set of alternate lines, such as the odd numbered lines, or the even numbered lines, depending upon the manner in which the aforementioned key was thrown. He must then return and throw the key in the opposite direction and connect the interrupting arrangements to the other set of cords and test the operation of the other set of alternate lines. Such an arrangement consumes an undue amount of time, for to test the busy signals of the twenty lines the test man must return from the far end of the switchboard and throw the key in the reverse direction and then make an additional trip to observe the signals of the other set of alternate lines.

With the arrangements of this invention a key is provided as in former arrangements upon the operation of which the sleeve circuits of either the odd numbered or even numbered cords will be interrupted and the busy signals of one set of alternate lines caused to function intermittently. At the far end of the switchboard is located another key which when operated serves to connect the interrupting apparatus to the other set of cords and cause the busy signals of the other set of alternate lines to operate intermittently, so that their operation may be observed by the test man upon his return trip along the switchboard. A motor and a rotary relay are provided for interrupting the sleeve circuits and the conductors associating the interrupting apparatus with the cords are connected to two bus-bars. Means are also provided for preventing the apparatus from becoming active upon the operation of the key at the far end of the switchboard until the key at the other end has been thrown.

Figure 2:
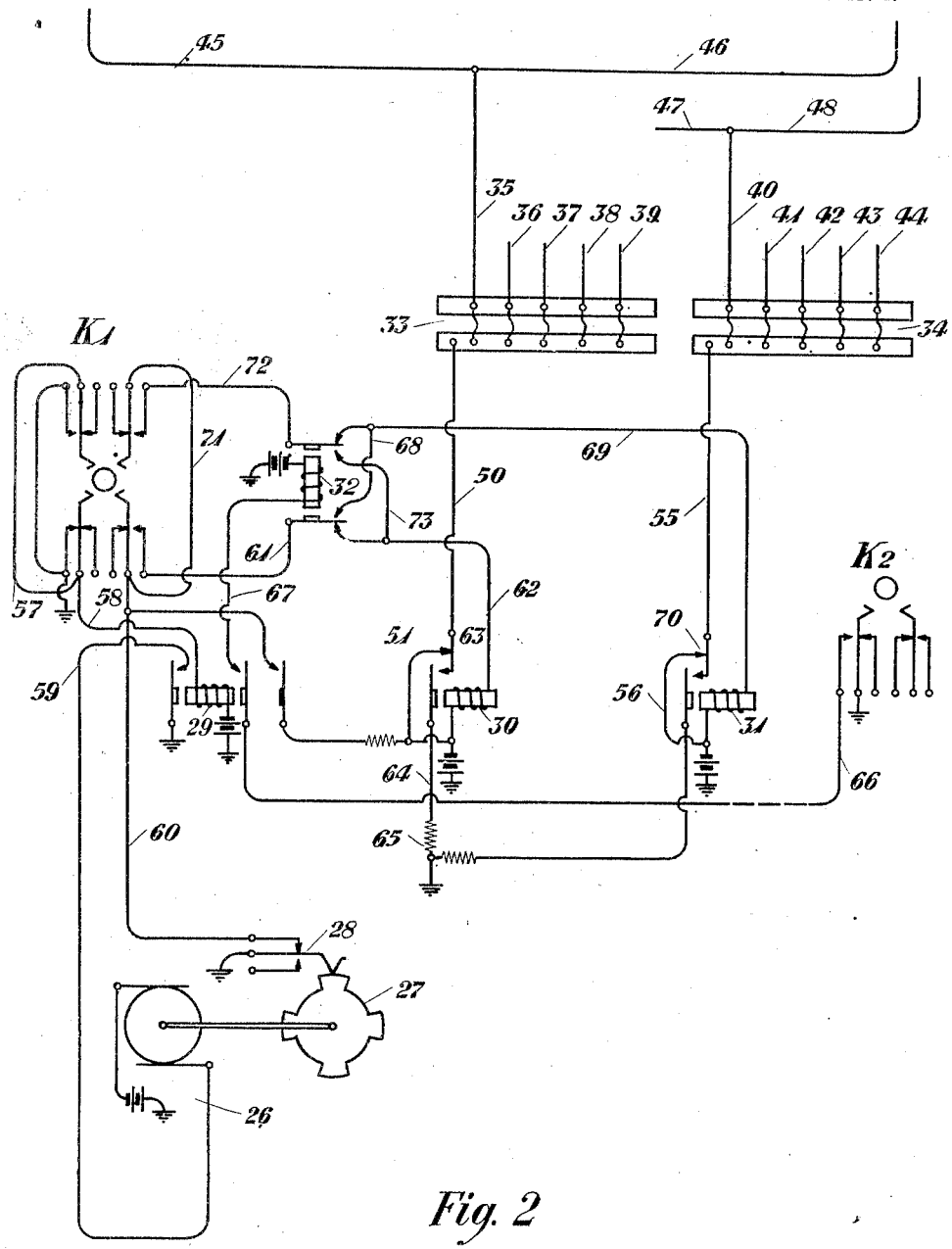

The invention may now be more fully understood from the following description of the drawing, the Figures 1 and 2 of which when taken together illustrate a circuit diagram of the preferred form of the invention. The Figs. 1 and 3 when taken together illustrate a modification of the arrangements.

In the Fig. 1 is illustrated a plurality of long distance lines terminating in multiple jacks at various positions in a switchboard such as the positions A, B and C. At the position A the lines terminate in jacks $J_1$, $J_2$, $J_3$, $J_4$, etc. At position B the lines terminate in jacks $J_1'$, $J_2'$, etc., and at position C the lines terminate in jacks $J_1''$, $J_2''$, etc. While only a specific number of lines have been shown as terminating in jacks at only the positions A, B and C it is understood that additional lines terminating in a similar manner at these and other positions may be included in this arrangement. Associated with each of the jacks at which the lines terminate is an annunciator or drop which operates whenever a connection is made with the line at one of the multiple jacks and serves to indicate to operators at other positions that the line is busy or in use. For example, associated with the jack $J_1$ is the annunciator or drop 20. Associated with the sleeve conductor of the multiple jacks on a line, such as the jacks $J_1$, $J_1'$, $J_1''$, etc., is a relay such as relay 1, which operates whenever a connection is made with the line at one of the jacks and serves to operate the annunciators or drops associated with such jacks. Adapted for making connections with such lines is the long distance cord circuit D terminating in the plugs $P_1$ and $P_2$. The cord circuit D is of a type well known in the art, and no further description thereof will be given. The cord circuit D is preferably located at a position at one end of the switchboard, and while only one cord circuit has been illustrated, it is understood that the arrangements of this invention may be associated with all of the cord circuits at such a position, which in practice usually number ten. In the Fig. 2 is illustrated apparatus which is associated in common with each of the cord circuits, such as the cord circuit D, located at the position at the end of the switchboard. Associated with the bus-bar 33 are the conductors 35, 36, 37, 38 and 39. Conductor 35 is connected to conductors 45 and 46 which are connected to the sleeve circuits of the cord D, which would be cord circuit number 1 of the ten cord circuits at the position. Conductors 36, 37, 38 and 39 would be connected to the sleeve circuits of cords numbered 3, 5, 7 and 9 which are similar to cord D and located at the same position. Connected to the bus-bar 34 are the conductors 40, 41, 42, 43 and 44. The conductor 40 is shown connected to conductors 47 and 48 which in turn would be connected to the sleeve circuits of the cord circuit number 2 at the position. The conductors 41, 42, 43 and 44 would be connected to the sleeve circuits of cords numbered 4, 6, 8 and 10, which are similar to cord D and located at the same position. Located at this position at the switchboard is a key $K_1$. The operation of the key $K_1$ serves to start the motor interrupter apparatus 26 into operation which in turn operates the rotary relay 27, the cams of which open at contact point 28, a circuit through either the relay 30 or the relay 31, depending upon which way the key $K_1$ is thrown. The rotary relay 27 opens a circuit through either the relay 30 or the relay 31 intermittently. Accordingly one of these relays will operate intermittently and will disconnect battery from either the bus-bar 33 or the bus-bar 34 and from the sleeve circuits of the cord circuits associated with these bus-bars. The intermittent opening and closing of these sleeve circuits will cause the intermittent operation of the annunciators or drops of the lines with which such cord circuits are associated. Located at the opposite end of the switchboard from the key $K_1$ is the key $K_2$ which controls the operation of relay 32, which in turn controls the operation of the relays 30 and 31, as will be pointed out later.

The operation of the arrangements illustrated in Figs. 1 and 2 is as follows: If it is desired to test the annunciators or busy signals of a number of lines, the ten-cord circuits at the position at the end of the switchboard will be inserted into the jacks of 20 lines in the following manner: The cord circuit number 1, such as the cord D, will be inserted in the jacks, such as jacks $J_1$ and $J_3$ of alternate lines, such as the odd numbered lines. The cord circuit number 2 similar to the cord circuit D will be inserted into jacks, such as jacks $J_2$ and $J_4$ of alternate and adjoining lines, such as the even numbered lines. The cord circuits such as the cord circuits numbered 3, 5, 7 and 9 will in a similar manner be associated with the adjoining odd numbered lines to be tested, and the cords 4, 6, 8 and 10 will in a similar manner be associated with the adjoining even numbered lines. When the plug $P_1$ is inserted in the jack $J_1$, the following circuit will be closed: from ground, winding of relay 1, sleeve conductor of the line, sleeve contact of jack $J_1$ and plug $P_1$, conductors 11, 12 and 13, winding of relay 14, conductor 45, conductor 35, bus-bar 33, conductors 50 and 51, to battery and ground. The closing of this circuit will operate the relay 1, which will pull up its armature and close the following circuit; from ground and battery, armature and contact of relay 1, conductors 5 and 6, over conductor 6 and through the windings of the electro-magnetic means associated with the annunciators 20, 24, 25, etc., to ground. The closing of this circuit will operate these electromagnetic means and cause all the annunciators or drops such as the annunciators 20, 24 and 25 to operate. When the plug $P_2$ is inserted in the jack $J_3$, the following circuit will be closed: from ground, winding of relay 3, sleeve conductor of jack $J_3$, sleeve contacts of jack $J_3$ and plug $P_2$, conductors 52 and 46, conductor 35, bus-bar 33, conductors 50 and 51, to battery and ground. The closing of this circuit will operate the relay 3 which in a manner similar to the relay 1 will cause the operation of the annunciators or drops, such as the annunciators 22, 53, 54, etc. associated with the line. The association of cord circuit number 2 with the jacks $J_2$ and $J_4$ will close circuits about the relays 2 and 4 associated with the sleeve conductors of such jacks, over the sleeve conductors of the cord circuit 2, which is similar to cord D, and over conductors 47 and 48 to conductor 40 and the bus-bar 34, and thence over conductors 55 and 56, to battery and ground. The closing of these circuits will operate the relays 2 and 4 which in a manner similar to the relays 1 and 3 will cause the annunciators or drops associated with such jacks and their multiple jacks to be operated. In a manner similar to the above the association of other cord circuits, such as the cords 3, 4, 5, etc., with the other lines will cause all the annunciators or drops associated with such lines to be operated. The key $K_1$ will now be operated. If the key $K_1$ is thrown in a downward direction, the following circuit will be closed: from ground, contacts of key $K_1$, conductor 58, winding of relay 29, to battery and ground. The closing of this circuit will operate relay 29, which will pull up its left hand armature and close the following circuit: from ground, armature and contact of relay 29, conductor 59, through motor apparatus 26, to battery and ground. The closing of this circuit will start the motor apparatus 26 in operation which in turn will cause the operation of the rotary relay 27. Upon the operation of rotary relay 27 the cams of this relay will intermittently open at contact point 28 the following circuit: from ground, contact point 28, conductor 60, contacts of key $K_1$, conductor 61, armature and contact of relay 32, conductor 62, winding of relay 30, to battery and ground. The closing of this circuit will operate the relay 30 which will pull up its armature and open at contact point 63 the formerly traced circuit from battery to the sleeve circuits of the cord circuits associated with the bus-bar 33. These circuits will now be completed from conductor 50, over the contact and armature of relay 30, conductor 64, resistance 65 to ground. The opening of this circuit and the removal of battery from the sleeve circuits of the cords associated with bus-bar 33 will cause the annunciators or drops on the odd numbered lines with which such cord circuits are connected to release. However, as the rotary relay 27 serves to intermittently open and close the circuit through relay 30, these annunciators or drops on these odd numbered lines with which connections have been made by cords associated with the bus-bar 33, will function intermittently. Accordingly if the cords have been connected to the lines as previously pointed out, the annunciators on odd numbered lines, such as the annunciators 20 and 22, etc., will now be caused to operate intermittently, while the annunciators on the even numbered lines adjoining these, such as the annunciators 21 and 23, etc., will merely remain operated. The test man by now walking along the switchboard may observe at each position the operation of these busy signals or annunciators of the odd numbered lines.

Upon arriving at the end of the switchboard, the test man will operate the key $K_2$ which is located at the end of the switchboard. This will close the following circuit: from ground, contacts of key $K_2$, conductor 66, armature and contact of relay 29, conductor 67, winding of relay 32 to battery and ground. The closing of this circuit operates relay 32, which will pull up its armatures and open at its lower contact the circuit formerly traced through the winding of relay 30. The cams of rotary relay 27 will now intermittently open and close at contact point 28, the following circuit:

from ground, contact point 28, conductor 60, contacts of key $K_1$, conductor 61, armature and contact of relay 32, conductor 68, conductor 69, winding of relay 31, to battery and ground. This will cause the relay 31 to operate intermittently, and to open at contact point 70 the previously traced circuit from battery to the bus-bar 34, and thence to the sleeve circuits of the cord circuits associated with the conductors 40, 41, 42, 43 and 44. Accordingly, the intermittent operation of relay 31 will cause the annunciators or drops on the even numbered lines with which connections are made by cord circuits associated with conductors 40, 41, 42, 43 and 44, to operate intermittently, while at the same time the annunciators or drops on the odd numbered lines with which connections are made by cord circuits associated with the conductors 35, 36, 37, 38 and 39 will remain operated. Accordingly, the test man upon his return trip to the other end of the switchboard may observe at each position the operation of the busy signals or annunciators of the even numbered lines.

If the key $K_1$ is thrown from normal in an upward direction the cams of rotary relay 27 will intermittently open and close the following circuit: from ground contact point 28, conductor 60, conductor 71, contact of key $K_1$, conductor 72, armature and contact of relay 32, conductor 69, winding of relay 31 to battery and ground. Thus, by first throwing the key $K_1$ in an upward direction the busy signals of the even numbered lines, with which connections are made by cord circuits connected to the bus-bar 34, may be caused to operate intermittently. The operation of the key $K_2$ will in the same manner as formerly pointed out operate the relay 32 which will pull up its armatures and cause the rotary relay 22 to intermittently interrupt the following circuit: from ground, contact 28, conductors 60 and 71, contacts of key $K_1$, conductor 72, armature and contact of relay 32, conductors 73 and 62, winding of relay 30 to battery and ground. Accordingly the direction in which the key $K_1$ and key $K_2$ are thrown controls which set of alternate lines, such as the odd numbered or even number lines, will be tested upon the initial trip of the test man along the switchboard.

In the Fig. 3 is illustrated a modification of the testing arrangements shown in Fig. 2. Similar reference numerals have been used to denote like parts in both figures.

The testing arrangements of Fig. 3 are associated with the sleeve circuits of the odd numbered cord circuits by conductors 35, 36, 37, 38 and 39, which conductors are associated with the contacts of relays 80, 81 and 82 instead of being connected to a bus-bar as in Fig. 2. The testing arrangements of Fig. 3 are associated with the sleeve circuits of the even numbered cord circuits by means of conductors 40, 41, 42, 43 and 44, which conductors are associated with the contacts of the relays 83, 84 and 85 instead of being connected to a bus-bar as in Fig. 2.

The operation of the arrangements illustrated in Fig. 3 is as follows: The ten cord circuits at position A will be associated with the jacks of the lines to be tested, in the same manner as previously pointed out with respect to Figs. 1 and 2. When the plug $P_1$ of the cord circuit 1 is inserted in the jack $J_1$, the following circuit will be closed: from ground, winding of relay 1, sleeve conductor of jack $J_1$, sleeve contacts of jack $J_1$ and plug $P_1$, conductors 11, 12 and 13, winding of relay 14, conductors 45 and 35, conductor 86, to battery and ground. The closing of this circuit will operate the relay 1 which, as formerly pointed out, will cause the operation of all the annunciators or drops, such as the annunciators 20, 24 and 25 of the line with which the connection is made. The insertion of the plug $P_2$ in the jack $J_3$ will close the following circuit: ground, winding of relay 3, sleeve conductor of jack $J_3$, sleeve contacts of jack $J_3$ and plug $P_2$, conductors 52 and 46, conductors 35 and 86, to battery and ground. The closing of this circuit will operate relay 3 which, in a manner previously pointed out, will operate all the drops or annunciators, such as the annunciators 22, 53, 54, etc. on the line with which the connection is made. When the cord circuit 2 is associated with the jacks $J_2$ and $J_4$, circuits will be closed about the windings of relays 2 and 4, over the sleeve circuits of the cord circuit and over conductors 47 and 48 to conductor 40 and thence over conductor 40 and over conductor 87 to battery and ground. The closing of these circuits will operate relays 2 and 4 and cause the operation of the annunciators or drops on the lines with which the connections have been made by the cord circuit 2. In a manner similar to the above, the association of the other circuits, such as the cords 3, 4, 5, etc. with the other lines will cause all the annunciators or drops associated with such lines to be operated. The key $K_1$ will now be operated. If the key $K_1$ is thrown in a downward direction the following circuit will be closed: from ground, contact of key $K_1$, conductor 88, winding of relay 29, to battery and ground. The closing of this circuit will operate relay 29 and close the following circuit: from ground, left hand armature and contact of relay 29, conductor 89, motor apparatus 26, to battery and ground. The closing of this circuit will start the motor apparatus 26 in operation, which in turn will cause the operation of the rotary relay 27. Upon the operation of rotary relay 27 the cams of this relay will intermittently open at contact point 28 the following circuit: from ground, contact point 28, conductor 90, contact of key $K_1$, conductor 91, armature and contact of relay 32, conductors 92 and 93, winding of relay 83, conductor 94, winding of relay 85, conductor 95, winding of relay 84, conductors 96 and 97, to battery and ground. The closing of this circuit will operate the relays 83, 84 and 85. The relay 85 will pull up its armature and open at contact point 98 the formerly traced circuit from battery to the sleeve circuit of the cord circuit associated with the conductor 40. The operation of relays 83 and 84, by pulling up their armatures, will in a similar manner open circuits leading from battery to the sleeve circuits of the cords associated with conductors 41, 42, 43 and 44. The opening of these circuits and the removal of battery from the sleeve circuits of the cords associated with conductors 40, 41, 42, 43 and 44 will cause the annunciators or drops on the even numbered lines with which such cord circuits are connected to release. However, as the rotary relay 27 serves to intermittently open and close the circuit through relays 83, 84 and 85, these annunciators or drops on the even numbered lines with which connections have been made by the cords associated with conductors 40, 41, 42, 43 and 44, will operate intermittently. Accordingly, if the cords have been connected to the lines as previously pointed out, the annunciators on the even numbered lines will now be caused to operate intermittently while the annunciators on the odd numbered lines adjoining these will merely remain operated. The test man by now walking along the switchboard may observe at each position the operation of these busy signals or annunciators of the even numbered lines.

Upon arriving at the end of the switchboard the test man will operate the key $K_2$ which is located at the opposite end of the switchboard from key $K_1$. This will close the following circuit: from ground, contact of key $K_2$, conductor 99, right hand armature and contact of relay 29, conductor 100, winding of relay 32, to battery and ground. This will operate the relay 32 which will pull up its armatures and open at its lower contact the formerly traced circuit through the relays 83, 84 and 85. The cams of the rotary relay 27 will now intermittently open and close at contact point 28 the following circuit: from ground, contact point 28, conductor 90, contact of key $K_1$, conductor 91, armature and contact of relay 32, conductors 101 and 102, winding of relay 80, conductor 103, winding of relay 82, conductor 104, winding of relay 81, conductor 105, to battery and ground. This will cause the relays 80, 81 and 82 to operate intermittently and to open at their contacts the previously mentioned circuits, from battery to the sleeve conductors of the cords associated with conductors 35, 36, 37, 38 and 39. Accordingly, the intermittent operation of the relays 80, 81 and 82 will cause the intermittent operation of the drops or annunciators on the odd numbered lines with which connections are made by the cord circuits connected to conductors 35, 36, 37, 38 and 39, while at the same time the annunciators or drops on the even numbered lines with which connections are made by the cord circuits associated with the conductors 40, 41, 42, 43 and 44 will merely remain operated. Accordingly, the test man upon his return trip to the other end of the switchboard may observe at each position the operation of the busy signals or annunciators of the odd numbered lines. By first throwing the key $K_1$ in an upward direction the busy signals of the odd numbered lines may be tested upon the initial trip of the test man along the board.

While the arrangements have been illustrated as adapted to be associated with ten cord circuits at a position and suitable for testing twenty lines, it is to be understood that it may be employed with any suitable number of cord circuits at a position. It is further understood that the invention is capable of embodiment in many and widely varied forms other than those herein illustrated.

What is claimed is:

1. A plurality of lines, signaling means associated with said lines, a plurality of cord circuits adapted to be connected with said lines, a testing apparatus associated with said cord circuits, circuits for said signaling means in said lines and cords and testing apparatus, switching means in said testing apparatus whereby a portion of said last mentioned circuits may be interrupted, and another switching means whereby the other portion of said circuits may be interrupted.

2. A plurality of lines, signaling means associated with said lines, a plurality of cord circuits adapted to be connected with said lines, a testing apparatus associated with said cord circuits, circuits for said signaling means in said lines and cords and testing apparatus, switching means in said testing apparatus whereby a portion of said last mentioned circuits may be interrupted, and another switching means whereby said circuits may be restored to normal and the other portion of said circuits may be interrupted.

3. A plurality of lines, signaling means included in the sleeve circuits of said lines, a plurality of cord circuits adapted to be connected with said lines, a testing apparatus including two sets of conductors, means to complete the sleeve circuits of a portion of said cords over one of said sets of conductors, means to complete the sleeve circuits of the other portion of said cords over the other of said sets of conductors, switching means whereby one of said two last mentioned means may be caused to function intermittently, and switching means whereby the other of said means may be caused to function intermittently.

4. A plurality of lines, signaling means included in the sleeve circuits of said lines, a plurality of cord circuits adapted to be connected with said lines, a testing apparatus including two sets of conductors, means to complete the sleeve circuits of a portion of said cords over one of said sets of conductors, means to complete the sleeve circuits of the other portion of said cords over the other of said sets of conductors, relay means controlling each of said last mentioned means, switching means for completing a circuit for one of said relays and for intermittently interrupting said circuit, and switching means for restoring said last mentioned relay to normal and for completing a circuit for the other of said relays and for intermittently interrupting said last mentioned circuit.

5. A testing apparatus including two sets of conductors, means to apply battery to each of said sets of conductors, a plurality of cord circuits, means to complete the sleeve circuits of said cord circuits over said sets of conductors, switching means whereby battery may be intermittently disconnected from one of said sets of conductors and continuously connected to the other of said sets of conductors, and other switching means whereby battery may be intermittently connected to said last mentioned set of conductors and continuously applied to the other of said sets of conductors.

6. A testing apparatus including two sets of conductors, means to connect a source of current to each of said sets of conductors, relay means controlling each of said last mentioned means, switching means, a rotary relay controlled thereby, a circuit, means controlled by said rotary relay for intermittently opening said circuit, means controlled by said switching means for completing said circuit through one of said first mentioned relay means, a second switching means, and means controlled thereby for completing said circuit through the other of said relay means.

7. A testing apparatus including two sets of conductors, means to connect a source of current to each of said sets of conductors, switching means whereby said source of current may be intermittently disconnected from one of said sets of conductors, and a second switching means operative when said first mentioned switiching means has been operated to connect said source of current continuously to said last mentioned set of conductors and to intermittently disconnect said source of current from the other of said sets of conductors.

8. A testing apparatus including two sets of conductors, means to connect a source of current to each of said sets of conductors, switching means whereby said source of current may be intermittently disconnected from one of said sets of conductors, a second switching means for reconnecting said source of current continuously to said last mentioned set of conductors and for intermittently disconnecting said source of current from the other of said sets of conductors, and means associated with said first mentioned switching means whereby the operation of said second switching means will be rendered a nullity until said first mentioned switching means has been operated.

In testimony whereof I have signed my name to this specification this 3rd day of April, 1919.

JOHN F. TOOMEY.